United States Patent
Imanishi et al.

(10) Patent No.: US 6,846,904 B1
(45) Date of Patent: Jan. 25, 2005

(54) METHOD FOR STABILIZING FLUOROCOPOLYMERS

(75) Inventors: Hiroyuki Imanishi, Settsu (JP); Yoshiyuki Hiraga, Settsu (JP); Masayuki Namimatsu, Settsu (JP); Satoshi Komatsu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 503 days.

(21) Appl. No.: 10/069,345

(22) PCT Filed: Aug. 24, 2000

(86) PCT No.: PCT/JP00/05674

§ 371 (c)(1),
(2), (4) Date: Feb. 25, 2002

(87) PCT Pub. No.: WO01/14430

PCT Pub. Date: Mar. 1, 2001

(30) Foreign Application Priority Data

Aug. 25, 1999 (JP) .......................... 11-238250

(51) Int. Cl.$^7$ ................................. C08F 6/28
(52) U.S. Cl. ..................... 528/501; 528/323; 524/544; 95/106
(58) Field of Search ................. 528/501, 323; 95/106; 524/544

(56) References Cited

U.S. PATENT DOCUMENTS

| | | | |
|---|---|---|---|
| 4,420,449 A | * 12/1983 | Crocker et al. | ................ 264/68 |
| 4,576,857 A | * 3/1986 | Gannett et al. | ............... 442/63 |
| 4,578,455 A | * 3/1986 | Pipper et al. | ................ 528/501 |
| 5,377,708 A | * 1/1995 | Bergman et al. | ............ 134/105 |
| 6,476,181 B1 | * 11/2002 | Alsop et al. | ................ 528/323 |

FOREIGN PATENT DOCUMENTS

| | | | |
|---|---|---|---|
| CA | 1248292 A | * | 1/1989 |
| CA | 1 248 292 | | 1/1989 |
| EP | 764668 A | | 3/1997 |
| EP | 0 764 668 A1 | | 3/1997 |
| EP | 0764688 A1 | * | 3/1997 |
| JP | 50-115293 A | | 9/1975 |
| JP | 50-115293 | * | 9/1975 |
| JP | 8 239420 | | 9/1996 |
| JP | 8-239420 A | * | 9/1996 |
| WO | WO-98/09784 | * | 3/1998 |
| WO | WO 98/09784 | | 3/1998 |
| WO | WO-01/14430 A1 | * | 3/2001 |

* cited by examiner

Primary Examiner—David W. Wu
Assistant Examiner—Henry S. Hu
(74) Attorney, Agent, or Firm—Birch, Stewart, Kolasch & Birch, LLP

(57) ABSTRACT

After a melt-processable fluorine-containing copolymer is heated and molten, the copolymer is reheatd in a closed apparatus under a non-static condition at a temperature of, for example, 130° C. to the melting point of the fluorine-containing polymer, whereby a content of volatile materials in the copolymer is reduced to 30% or less of an initial content of volatile materials. Thereby, the content of volatile materials in the melt-processable fluorine-containing copolymer, which has been once molten, can be effectively decreased without using a large apparatus while avoiding the contamination of the copolymer with foreign particles.

8 Claims, No Drawings

METHOD FOR STABILIZING FLUOROCOPOLYMERS

This application is the national phase under 35 U.S.C. § 371 of PCT International Application No. PCT/JP00/05674 which has an International filing date of Aug. 24, 2000, which designated the United States of America.

FIELD OF THE INVENTION

The present invention relates to a method for stabilizing a fluorine-containing copolymer. In particular, the present invention relates to a method for improving the thermal stability of a melt-processable fluorine-containing copolymer.

BACKGROUND ART

For example, when an emulsion polymerized copolymer of tetrafluoroethylene and hexafluoropropylene is melt processed to obtain a final product, bubbles or voids may form due to volatile materials in the final product. The volatile materials are generated from polymer chain terminals and polymer backbones which are unstable against heat and/or shear force. If such unstable sites are stabilized during melt processing, the volatile materials still remain in the polymer processed, and thus the bubbles and voids may form when the polymer is processed to the final product.

JP-A-56-44883 discloses a method for reducing the content of volatile materials in a tetrafluoroethylene-hexafluoropropylene copolymer to 70% or less of the initial content of the volatile materials by heating the copolymer which is statically placed on a pan or a mesh in an open condition, for example, in an electric furnace. However, the treatment in the open condition can hardly avoid the migration of foreign materials from outside to the heating process. Although the content of the volatile materials can be reduced by static heating, when the filling depth of the copolymer increases, the treating time is prolonged with the influence of diffusion of the volatile materials, and also the treatment inside the layer of the copolymer filled becomes less uniform. To decrease the filling depth of the copolymer, a dish or a mesh having a large area is necessary. As a result, a large apparatus is required.

DISCLOSURE OF THE INVENTION

An object of the present invention is to provide a method for effectively decreasing the content of volatile materials in a melt-processable fluorine-containing copolymer, which has been once molten, without using a large apparatus while avoiding the contamination of the copolymer with foreign particles.

According to the present invention, the above object is achieved by a method for stabilizing a melt-processable fluorine-containing copolymer comprising heating and melting the copolymer and then reheating the copolymer in a closed apparatus under a non-static condition, whereby a content of volatile materials in the copolymer is reduced to 30% or less of an initial content of volatile materials.

The "content of volatile materials" used herein is expressed by a percentage (%) of a weight loss of the copolymer after heating the dried copolymer at 380° C. under an absolute pressure of about 10 mmHg for 30 minutes based on the weight of the dried copolymer before heating.

The melt-processable fluorine-containing copolymer to be treated by the method of the present invention may be any one of known melt-processable fluorine-containing copolymers. Examples of the melt-processable copolymer include copolymers of at least two monomers selected from the group consisting of tetrafluoroethylene (TFE), hexafluoropropylene (HFP), perfluoroalkyl vinyl ethers, ethylene (E) and vinylidene fluoride (VdF), vinylidene fluoride homopolymer, etc. In particular, a TFE-HFP-perfluoroalkyl vinyl ether copolymer containing 8 to 25% by weight of HFP and 0 to 5% by weight of the perfluoroalkyl vinyl ether is preferable.

Here, the perfluoroalkyl vinyl ether is preferably a vinyl ether of the formula:

wherein m is a number of 1 to 6, or the formula:

wherein n is a number of 1 to 4.

The melt-processable fluorine-containing copolymer is preferably prepared from the above monomers by emulsion or suspension polymerization.

When the copolymer is a tetrafluoroethylene-hexafluoropropylene copolymer (FEP), a TFE-perfluoroalkyl vinyl ether copolymer (PFA) or a TFE-HFP-perfluoroalkyl vinyl ether copolymer, it preferably has a melt viscosity of 0.1 to 100 kPa.s at 372° C.

In one preferable embodiment, the method of the present invention includes two-step treatment comprising the steps of heating the fluorine-containing copolymer at a temperature of 360 to 430° C. for 10 minutes or less to melt the copolymer, and then reheating the copolymer at a temperature from 130° C. to the melting point of the fluorine-containing copolymer, preferably from 150° C. to the melting point of the fluorine-containing copolymer.

The first heating step may comprise heating the copolymer with an extruder or heating the copolymer which is statically placed on a dish in an electric furnace equipped with a means to avoid the migration of foreign materials into the furnace.

When the temperature in the first heating step is lower than 360° C., the unstable sites at the copolymer chain terminals and in the copolymer backbones are not sufficiently stabilized. Therefore, even if the copolymer is reheated in the second step to decrease the content of the volatile materials, the copolymer may be bubbled in the melt processing of the copolymer to produce the final product.

In the method of the present invention, the heating in the second step can decrease the content of the volatile materials while maintaining the figure of the fluorine-containing copolymer which has been molten in the first step and shaped in a desired figure.

The heating in the second step is carried out in a temperature range from 130° C. to the melting point of the fluorine-containing copolymer according to the relationship:

$$\log t = 6.12 - 0.0119T$$

wherein t is a treating time (hours) and T is a treating temperature (absolute temperature K) to reduce the volatile materials.

When the temperature in the second step is lower than 130° C., the treating time is extended, and furthermore the volatile materials are not sufficiently decreased.

When the heating in the second step is continuously carried out, hot air flowing at a superficial velocity of 0.8 m/sec. or less, preferably 0.05 to 0.5 m/sec. is used as a heating source, or such hot air is used in combination with heat conduction from the equipment wall.

When the heating in the second step is continuously carried out, preferably a residence time in the apparatus is controlled uniformly, and the properties of the product exited from the apparatus are made uniform.

In the case of continuously charging and discharging the copolymer, when the superficial velocity of the hot air exceeds 0.8 m/sec., the copolymer may be floated and mixed under the influence of the air flow and pressure of the hot air and thus it may become difficult to carry out the heating so that the copolymer uniformly containing the volatile materials is obtained.

The heating apparatus used in the present invention is not an open one but is a closed one which is closed during heating. The apparatus may be a vertical one or a horizontal one.

Herein, the "closed apparatus" means, either in a continuous process or in a batch process, an apparatus the interior atmosphere of which is not in direct contact with outside atmosphere during heating, and into which, only an air containing the controlled number of foreign materials having the limited maximum particle size is introduced through a filter, etc. except a part through which the copolymer is introduced in and removed from the apparatus. That is, it is not necessary to completely shield the interior atmosphere from the outside atmosphere (atmospheric air).

Herein, the term "non-static condition" is used to exclude the heating of the copolymer which is statically placed in a container such as a dish. For example, in the case of a continuous process, this term means a condition of a moving layer such that the particles of the copolymer are filled in the apparatus in a layered state, and they continuously move through the apparatus according to the feeding rate of the copolymer and finally exit from the apparatus. In the case of a batch process, this term means a state where the copolymer is forcibly floated or fluidized with an agitator, etc.

The apparatus used for reheating may be a batch type one or a continuous type. A temperature distribution and the distribution of a decreasing rate of the volatile material can be controlled in relatively narrow ranges by continuously charging and discharging the copolymer, and thus the fluorine-containing copolymer which does not suffer from bubbling can be constantly produced.

In the case of a vertical continuous apparatus, a moving layer type one is advantageous, in which the copolymer is charged to an upper part of the apparatus and heated while it moves from the upper part to the lower part, and then it exits from the lower part of the apparatus. In the case of a horizontal batch apparatus, it is efficient to fluidize the fluorine-containing copolymer with an agitator such as a hot-air drier, a heat conduction-transfer drier, etc.

The migration of the foreign materials from outside can be prevented by forcibly supplying hot air to heat the copolymer in the closed apparatus. In the case of the moving layer type vertical apparatus for continuous processing, for example, rotary valves are provided at a charging part and a discharging part and the interior pressure is made slightly higher than the atmospheric pressure, whereby the migration of the foreign materials into the apparatus can be prevented.

Furthermore, a apparatus for continuously cooling the fluorine-containing copolymer may be installed downstream the reheating apparatus to cool the copolymer to a temperature, at which the copolymer is finally shipped, or lower, for example, 60° C. or lower.

EXAMPLES

The present invention will be illustrated by the following examples.

Hereinafter, the "content of volatile materials" is expressed by a percentage (%) of a weight loss of the copolymer after heating the dried copolymer at 380° C. under an absolute pressure of about 10 mmHg for 30 minutes based on the weight of the dried copolymer before heating.

The bubbling test is carried out by heating a molded sheet of the copolymer having a thickness of 2.0 mm at 300° C. for 10 minutes to melt the sheet. When the generation of bubbles in the sheet is observed with an eye, it is ranked "Bubbling", while the generation of bubbles is not observed, it is ranked "No bubbling".

The presence of foreign materials is evaluated by observing the presence of the foreign materials in a disc-shape sheet having a thickness of about 3 mm and a diameter of 120 mm, which is molded at 370° C.

Example 1

A TFE-HFP-perfluoropropyl vinyl ether copolymer, which was prepared by suspension polymerization, was used as a fluorine-containing copolymer.

This copolymer had a melt viscosity of 2.3 kPa.s, a content of volatile materials of 0.88% by weight before extrusion, a HFP content of 11.5% by weight, and a content of perfluoropropyl vinyl ether of 0.9% by weight.

The copolymer was washed and dried, and then extruded at a residence time of 2 minutes at 370° C. with a single screw extruder having an inner diameter of 95 mm and a L/D ratio of 30. The extruded fluorine-containing copolymer was pelletized with a pelletizer, and then continuously charged and reheated in a moving layer, which was designed so that a residence time was 5 hours at 200° C. Hot air as a heat source was continuously supplied to a reheating apparatus at a superficial velocity of 0.35 m/sec. after removing foreign materials with passing the hot air through a filter (cutting 99.97% of 3 µm particles).

The reheating apparatus had a height of 3,650 mm and an inner diameter of 850 mm. A cone-form punching metal was provided at the lower part of the apparatus to separate a hot air inlet from the moving layer. Thereby, the discharging of the pellets was facilitated.

The pellets, which were continuously discharged from the reheating apparatus, were then charged in a cooling apparatus and cooled to 60° C. or lower, and continuously collected.

The pellets, which were collected from the cooling apparatus, contained 0.23% by weight of the volatile materials, which was 26% of the initial content of the volatile materials (0.88% by weight). In the bubbling test, no bubble was observed, and no foreign material was contained in the pellets.

Comparative Example 1

The pellets, which were collected after extrusion and before reheating in Example 1, had a content of volatile materials of 0.75% by weight, and bubbles formed in the bubbling test.

Comparative Example 2

The pellets, which were collected after extrusion and before reheating in Example 1, were statically placed on a dish in an electric furnace in a depth of about 20 mm and reheated at 200° C. for 5 hours. The content of the volatile materials after reheating was 0.31% by weight. That is, the content of the volatile materials decreased to 35% of the initial content of the volatile materials and thus no bubble formed in the bubbling test. However, the pellets were contaminated with foreign materials from outside in the reheating step in the electric furnace, and a plurality of black foreign particles were observed with an eye.

The above results are summarized in Table 1.

TABLE 1

| | Content of volatile materials [percentage based on initial content of volatile materials] | Presence of foreign materials | Bubbling test |
|---|---|---|---|
| Ex. 1 | 0.23 wt. % [26%] | No | No bubbling |
| C.E. 1 | 0.75 wt. % [85%] | No | Bubbling |
| C.E. 2 | 0.31 wt. % [35%] | Yes | No bubbling |

Example 2

The same fluorine-containing copolymer as one used in Example 1 was extruded with a single screw extruder having an inner diameter of 95 mm and a L/D ratio of 30 at 375° C. at a residence time of 2 minutes. The extruded pellets were conveyed with an air which was passed through a filter (cutting 99.97% of 3 μm particles) so that the pellets were not in direct contact with the outside atmosphere, and continuously charged in a moving layer, which was designed so that a residence time was 1.5 hours at 235° C., and reheated with a hot air under the same conditions as those in Example 1.

The pellets discharged from the extruder had a content of volatile materials of 0.14% by weight, which was 16% of the initial content of the volatile materials. No bubbling was observed in the bubbling test.

Comparative Example 3

The pellets, which were collected after extrusion and before reheating in Example 2, had a content of volatile materials of 0.68% by weight, and bubbles formed in the bubbling test.

Comparative Example 4

The pellets, which were collected after extrusion and before reheating in Example 2, were statically placed on a dish in an electric furnace in a depth of about 150 mm and reheated at 235° C. for 1.5 hours.

The content of the volatile materials in the upper part of the accumulated pellets (a depth of 25 mm from the surface of the accumulated layer of the pellets) was 0.18% by weight, and no bubble formed in the bubbling test.

However, the content of the volatile materials in the lower part of the accumulated pellets near the dish (a layer of 0 to 30 mm from the bottom surface of the dish) was 0.41% by weight. That is, the content of the volatile materials was decreased only to 47% of the initial content of the volatile materials, and bubbling was observed in the bubbling test. This is because the thickness of the pellet layer filled in the dish was large, and the influence of diffusion of volatile materials could not be negligible so that the volatile materials could not be reduced in the lower part in the dish.

Like Comparative Example 2, the pellets were contaminated with foreign materials from outside in the reheating step in the electric furnace, and a plurality of black foreign particles were observed with an eye. The foreign particles were found not only in the upper part but also in the lower part.

The results in Example 2 and Comparative Examples 3–4 are summarized in Table 2.

TABLE 2

| | Content of volatile materials [percentage based on initial content of volatile materials] | Presence of foreign materials | Bubbling test |
|---|---|---|---|
| Ex. 2 | 0.14 wt. % [16%] | No | No bubbling |
| C.E. 3 | 0.68 wt. % [77%] | No | Bubbling |
| C.E. 4 (upper part) | 0.19 wt. % [22%] | Yes | No bubbling |
| C.E. 4 (lower part) | 0.41 wt. % [47%] | Yes | Bubbling |

Comparative Example 5

The pellets, which were extrusion molded in the same way as in Example 2, were continuously charged to a moving layer in a vertical cylindrical apparatus, which was designed so that a residence time was 24 hours at 120° C., to reheat the pellets. Hot air as a heat source was continuously supplied to the cylindrical apparatus at a superficial velocity of 0.40 m/sec. after passing the hot air through a filter (cutting 99.97% of 3 μm particles). The pellets discharged from the cylindrical apparatus had a content of volatile materials of 0.56% by weight. Thus, the content of volatile materials decreased only to 64% of the initial content of volatile materials, and bubbling was observed in the bubbling test.

What is claimed is:

1. A method for stabilizing a melt-processable fluorine-containing copolymer which comprises heating and melting said copolymer, disposing said copolymer in a closed apparatus, and then reheating said copolymer in said closed apparatus under non-static conditions, whereby a content of volatile materials, wherein the content of volatile materials is expressed by a percentage of a weight loss of the polymer after heating the dried copolymer at 380° C. under an absolute pressure of about 10 mmHg for 30 minutes based on the weight of the dried copolymer before heating in the copolymer is reduced to 30% or less of an initial content of volatile materials.

2. The method for stabilizing a melt-processable fluorine-containing copolymer according to claim 1, wherein a reheating temperature is from 130° C. to a melting point of said fluorine-containing copolymer.

3. The method for stabilizing a melt-processable fluorine-containing copolymer according to claim 1 or 2, wherein the reheating step is carried out with suppressing migration of foreign materials from outside to said closed apparatus.

4. The method for stabilizing a melt-processable fluorine-containing copolymer according to claim 1 or 2, wherein said fluorine-containing copolymer is a copolymer of at least two monomers selected from the group consisting of tetrafluoroethylene, hexafluoropropylene, perfluoroalkyl vinyl ethers, ethylene and vinylidene fluoride.

5. The method for stabilizing a melt-processable fluorine-containing copolymer according to claim 4, wherein said fluorine-containing copolymer is a tetrafluoroethylene-hexafluoropropylene-perfluoroalkyl vinyl ether copolymer containing 8 to 25% by weight of hexafluoropropylene and 0 to 5% by weight of the perfluoroalkyl vinyl ether.

6. The method for stabilizing a melt-processable fluorine-containing copolymer according to claim 1 or 2, wherein said fluorine-containing copolymer is heated to a temperature of 360 to 430° C. for 10 minutes or less before reheating.

7. The method for stabilizing a melt-processable fluorine-containing copolymer according to claim 1 or 2, wherein said fluorine-containing copolymer has a melt viscosity of 0.1 to 100 kPa.s at 372° C.

8. The method for stabilizing a melt-processable fluorine-containing copolymer according to claim 1 to 2, wherein the reheating in the closed apparatus is continuously carried out.

* * * * *